May 22, 1934.  E. J. BROUHARD  1,959,655
WHEEL HOLDER
Filed Nov. 21, 1932   2 Sheets-Sheet 1
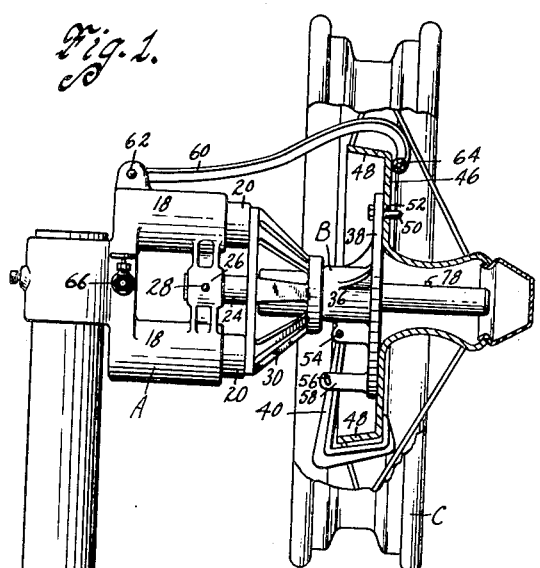
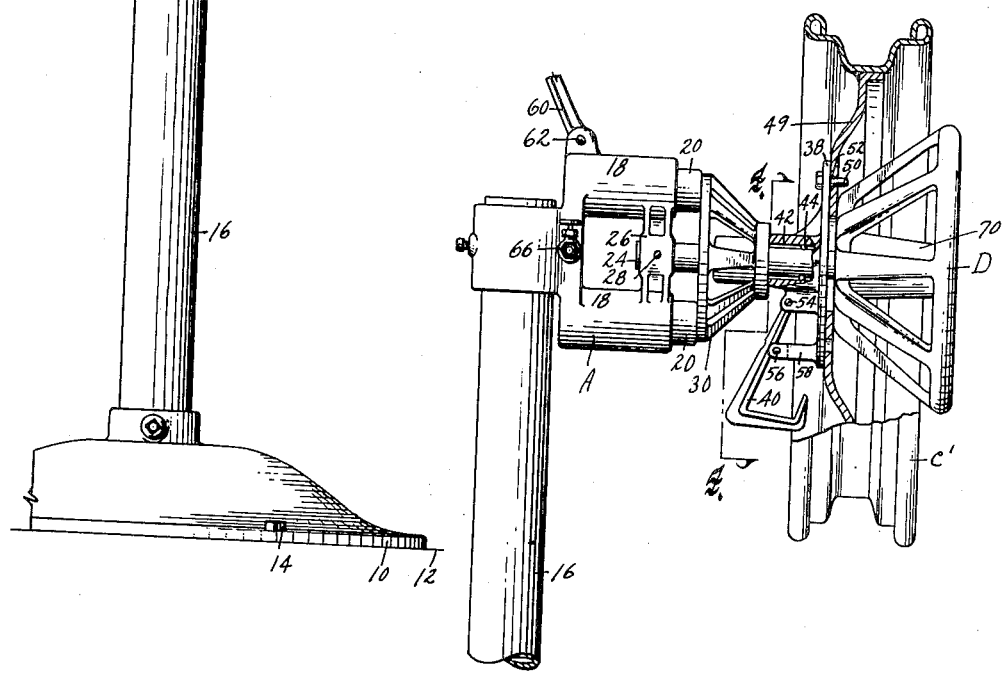
Witness
H. S. Munzenmaier
Inventor
Edward J. Brouhard
by Bair, Freeman & Sinclair
Attorneys May 22, 1934.    E. J. BROUHARD    1,959,655
WHEEL HOLDER
Filed Nov. 21, 1932    2 Sheets-Sheet 2
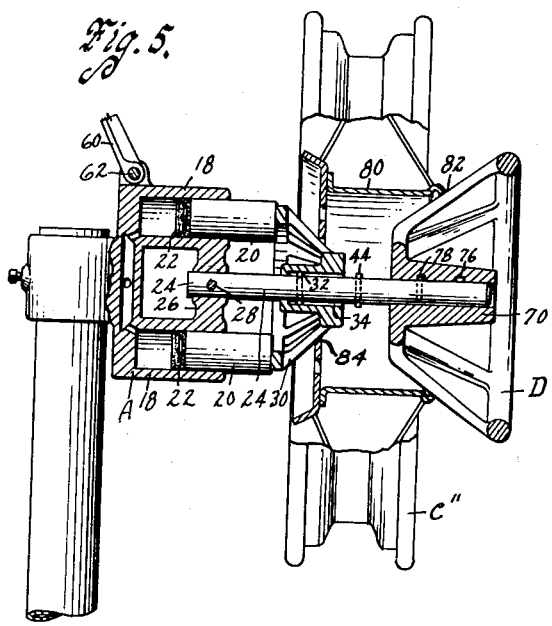
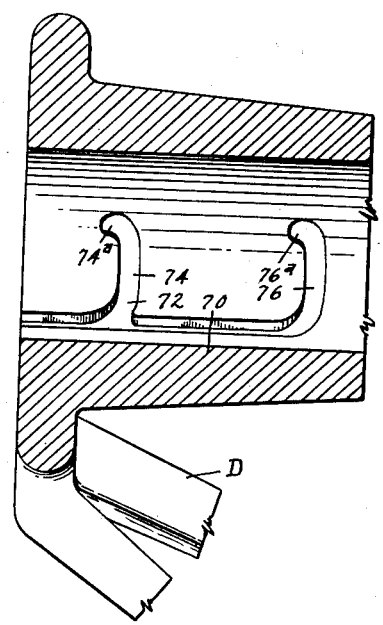
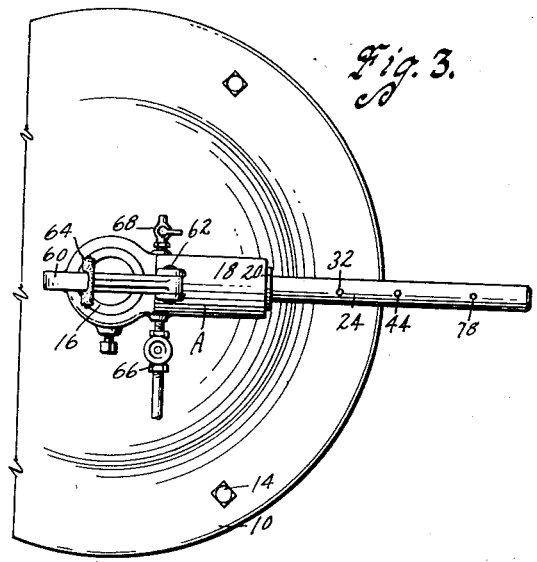
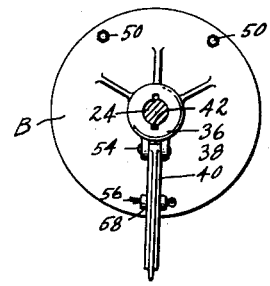
Witness
H. S. Munjenmaier
Inventor
Edward J. Brouhard
by Bair, Freeman & Sinclair
Attorneys Patented May 22, 1934

1,959,655

UNITED STATES PATENT OFFICE 1,959,655

WHEEL HOLDER

Edward J. Brouhard, Des Moines, Iowa

Application November 21, 1932, Serial No. 643,703

15 Claims. (Cl. 144—288)

The object of my invention is to provide a wheel holder which is simple, durable and comparatively inexpensive to manufacture.

More particularly, it is my object to provide a holder for automobile wheels to be used while tires are being removed therefrom or applied thereto, the holder being adapted for various types and sizes of wheels and being readily operable to hold them in a convenient supported position.

Still a further object is to provide a holder which is especially desirable for drop center rim types of automobile wheels to and from which it is difficult to apply and remove tires while the wheel is lying on the ground, the tire applying or removing operation being much more easily accomplished by supporting the wheel in an upright position.

Still a further object is to provide a wheel holder in which flanges or hub parts of a wheel may be engaged by appropriate wheel engaging members so that when these members are moved toward each other, the wheel is securely clamped on the support and held in an upright supported position, the device being especially adapted for use in garages and tire repair shops.

Still a further object is to provide a wheel holder in which compressed air is used for clamping the wheel in position so that it may be quickly clamped by admitting compressed air to it, or can be quickly unclamped by exhausting the compressed air therefrom.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my wheel holder showing one type of wheel supported thereon.

Figure 2 is a somewhat similar view showing another type of wheel in supported position.

Figure 3 is a plan view of the device with the wheel engaging elements removed therefrom.

Figure 4 is a vertical sectional view on the line 4—4 of Figure 2.

Figure 5 is a vertical sectional view showing still another type of wheel supported on the holder; and Figure 6 is an enlarged sectional view of one of the wheel engaging elements to illustrate its construction.

On the accompanying drawings, I have used the reference numeral 10 to indicate a base. The base 10 may be bolted to a floor surface 12 by lag screws or the like 14 so that the device will be rigidly supported in position on a floor surface.

An upright 16 is secured in the base 10 and has on the upper end thereof, a head A. The head A comprises a pair of cylinders 18 which are adapted to receive pistons 20. The pistons 20 have cup leathers 22 to prevent air leakage between the cylinder walls and the pistons.

A projecting shaft 24 serves as a support and is secured in a cross bar 26 of the head A. A pin 28 additionally secures the shaft 24 relative to the head A. On the supporting shaft 24 I provide a wheel engaging element 30 which is cone-shaped and which is slidable but non-rotatable relative to the shaft.

By means of a key 32 and keyways 34 formed in the bore of the wheel engaging element 30, the element is made slidable but non-rotatable relative to the shaft. Also by terminating the keyways 34 short of the left hand end of the hub of the element 30, as shown in Figure 5, its movement is limited so that the pistons 20 will not be expelled from the cylinders 18.

Another wheel engaging element is provided and it is indicated generally by the reference character B. It comprises a hub 36, a flange 38 and a hook arm 40. The hub 36 is provided with a pair of keyways 42 adapted to coact with a second key 44 through the shaft 24 to prevent the wheel engaging element B from rotating relative to the shaft, yet permitting its sliding movement relative thereto.

The flange 38 is adapted to engage a flange 46 of a wheel C (see Figure 1) or the disk 49 of a wheel C' (see Figure 2). The flange 46 is a radial flange and it terminates in a cylindrical flange 48 which covers the brake drum of the wheel when the wheel is mounted on the automobile.

The flange 38 of the wheel engaging element B is provided with a pair of studs 50 adapted to extend through wheel bolt holes 52 of the flange 46. The hook arm 40, it will be noted, is pivoted at 54 to the hub 36 and may be retained in the position of Figure 1 by inserting a key 56 through a forked arm 58.

In mounting the wheel C on the wheel holder, it is tipped so that the flange 48 can enter the hook arm 40 and then swung in a counterclockwise direction in Figure 1 until the holes 52 receive the studs 50. Thereafter a second hook arm 60 which is pivoted at 62 to the head A is swung to position for engaging the flange 46, the arm 60 having a wheel engaging hook end 64 for this purpose.

After the wheel is mounted in the position shown in Figure 1, a valve 66, which is connected with a source of compressed air, is opened for admitting air to the cylinders 18 and thus forcing the pistons 20 outwardly. This causes the wheel to be clamped between the hook 64 and the flange 38 and thus rigidly held in position while a tire is removed from or applied to the wheel. When it is desired to remove the wheel, the valve 66 is closed and an exhaust valve 68 (see Figure 3) is opened for permitting the pistons 20 to be pushed inwardly so that the hook 64 can be unhooked and the wheel then removed from the holder.

In Figure 2, a wheel for a "Jumbo" tire is illustrated. These are usually of the disk type and the hook arm 40 is not needed. It can accordingly be swung to the position shown in Figure 2 after the pin 56 has been removed from the forked arm 58 and then the pin 56 can be re-inserted to keep the arm 40 out of the way.

In Figure 2, the second wheel engaging element is indicated at D. It is of different character than the wheel engaging element B and takes the place of the hook arm 60 in Figure 1. The hook arm, it will be noted, can be swung to a position out of the way while the wheel engaging element D is in use.

The wheel engaging element D is of cone-shaped construction and has a hub 70. The hub 70, as shown in Figure 6, has a multibayonet slot, the longitudinal portion of which is indicated at 72, a pair of radial portions at 74 and 76 and seat portions at 74a and 76a. Two of the portions 74 and 76 are provided so as to give two different adjustments of the wheel engaging element D longitudinally relative to the supporting shaft 24, the shaft having a bayonet pin 78 to coact with either of them as found desirable.

The wheel engaging element, due to its bayonet pin and bayonet slot connection with the shaft 24, may be mounted stationarily thereon or removed therefrom. After it is mounted in the position of Figure 2, compressed air may be admitted to the cylinders 18 for moving the flange 38 of the wheel engaging element B toward the wheel engaging element D and thus resulting in a clamping action of the disk 49 between them.

In Figure 5, I show a wheel C'' which has a hub 80, openings 82 and 84 being provided in the ends of the hub. For this type of wheel, the wheel engaging elements 30 and D are used. Since they are cone-shaped, they engage in the openings 82 and 84 and depending on the sizes of the openings, the elements will fit different distances into them. Especially on these types of wheels in which the length of the hub and the size of the openings vary in different makes of wheels, the double bayonet slot is desirable for giving a rough adjustment at first to that the pistons 20 can accommodate a great variety of wheels without making them proportionally longer than shown on the drawings.

From the description of my invention, it will be obvious that it is readily adaptable for supporting a variety of different types of automobile wheels. It is readily adjusted for any type and may be quickly operated to either mount or demount the wheel relative to the holder.

The details of structure can be somewhat changed, as illustrated on the drawings and other changes may also be made without departing from the real spirit and purpose of my invention, and it is my intention to cover by my claims, any modified forms of structure or use of mechanical equivalents, which may be reasonably included within their scope.

I claim as my invention:

1. In a wheel holder, a support, a shaft extending therefrom, a wheel engaging element stationary relative thereto and adapted to engage one side of a wheel, a complementary wheel engaging element slidable relative to said shaft and adapted to engage the other side of the wheel, said last wheel engaging element having a hook for engagement with the periphery of a cover flange on said wheel and studs to engage in wheel bolt openings of said cover flange and means for sliding said second wheel engaging element relative to said shaft.

2. In a wheel holder, a projecting support, a wheel engaging element stationary on the outer end thereof but removable therefrom, wheel engaging means slidable relative to said support and spaced inward from said wheel engaging element and means for sliding said wheel engaging means relative to said support for moving it toward said wheel engaging element.

3. In a wheel holder, a projecting support, a wheel engaging hook pivoted to said support and having a wheel engaging end adjacent the outer end thereof, wheel engaging means slidable relative to said support and spaced inward from the wheel engaging end of said hook, said means comprising a flanged member for engaging a flange of a wheel and means for sliding said wheel engaging means relative to said support for moving it toward the wheel engaging end of said hook.

4. In a wheel holder, a projecting support, a wheel engaging hook pivoted to said support and having a wheel engaging end adjacent the outer end thereof, wheel engaging means slidable relative to said support and spaced inward from the wheel engaging end of said hook, said means comprising a flanged member for engaging a flange of a wheel, a hook for engaging the periphery of said flange and studs for engaging wheel bolt openings of said flange and means for sliding said wheel engaging means relative to said support for moving it toward the wheel engaging end of said first mentioned hook.

5. For use with a wheel having a hub and a cover flange, a wheel holder comprising a support received by said hub, a flanged member slidable relative to said support and engaging said cover flange, means on said flanged member to coact with said cover flange and thereby support it relative to said support, means for sliding said flanged member outwardly relative to said support and a hook arm pivoted to said support and adapted to engage said cover flange to oppose movement of said flanged member.

6. For use with a wheel having a hub and a cover flange, a wheel holder comprising a support received by said hub, a flanged member slidable relative to said support and engaging said cover flange, studs and a hook on said flanged member to coact with wheel bolt holes and the periphery of said cover flange and thereby support it relative to said support, means for sliding said flanged member outwardly relative to said support and a hook arm pivoted to said support and adapted to engage said cover flange to oppose movement of said flanged member.

7. For use with a wheel having a hub and a cover flange, a wheel holder comprising a support received by said hub, a flanged member slidable relative to said support and engaging said cover flange, means on said flanged member to coact with said cover flange and thereby support it relative to said support, means for sliding said flanged member outwardly relative to said support and means stationary relative to said support and adapted to engage said wheel to oppose movement of said flanged member.

8. For use with a disk wheel having an axle opening therethrough, a wheel holder comprising a projecting support mounted at one of its ends for its opposite end to extend through said axle opening, a wheel engaging element slidable thereon between the mounted end of said support and the disk of said wheel for engaging one side thereof, a second wheel engaging element stationary on said support for engaging the other side of the disk and means for moving the first wheel engaging element relative to said support and toward the second wheel engaging element to clamp said disk between them.

9. For use with a wheel having a hub provided with openings at each end thereof, a wheel holder comprising a projecting support, a cone-shaped member thereon and slidable relative thereto, a second cone-shaped member thereon spaced outwardly from said first mentioned cone-shaped member, said cone-shaped members engaging the interiors of said openings and means operable to move said first cone-shaped member toward the second cone-shaped member.

10. For use with a wheel, a wheel holder comprising a base, a support projecting therefrom to project through the wheel, movable means thereon for engaging the side of said wheel adjacent the base, stationary means on said support for engaging the opposite side of said wheel, said stationary means being removable from said projecting support, means for attaching it thereto at different distances from said support and means operable to move said movable means away from said base and toward said stationary means.

11. For use with a wheel, a wheel holder comprising a projecting support to project through the wheel, movable means thereon for engaging the side of said wheel next to said support, stationary means on said support for engaging the opposite side of said wheel, said stationary means having a bayonet pin and bayonet slot connection with said support and means operable to move said movable means toward said stationary means.

12. For use with a wheel, a wheel holder comprising a projecting support to project through the wheel, movable means thereon for engaging the side of said wheel adjacent said support, stationary means on said support for engaging the opposite side of said wheel, said stationary means having a bayonet pin and multibayonet slot connection with said support and means operable to move said movable means toward said stationary means.

13. A wheel holder comprising a support, a pair of cylinders mounted thereon, a shaft arranged between said cylinders and projecting from said support, a wheel engaging element slidable on said shaft, pistons in said cylinders engaging said wheel engaging element and a second wheel engaging element stationarily mounted on the outer end of said shaft.

14. A wheel holder comprising a support, a pair of cylinders mounted thereon, a shaft arranged between said cylinders and projecting from said support, a wheel engaging element slidable on said shaft, pistons in said cylinders engaging said wheel engaging element and a second wheel engaging element stationarily and removably mounted on the outer end of said shaft.

15. In a wheel holder, a projecting support, a wheel engaging element stationary on the outer end thereof but removable therefrom, wheel engaging means slidable relative to said support and spaced inward from said wheel engaging element and mechanism for sliding said wheel engaging means relative to said support for moving it toward said wheel engaging element, said mechanism comprising an expansible chamber operatively connected with said wheel engaging means and means for introducing fluid pressure thereto and exhausting the same therefrom.

EDWARD J. BROUHARD.